(12) United States Patent
Basnett

(10) Patent No.: US 6,672,605 B2
(45) Date of Patent: Jan. 6, 2004

(54) VEHICLE SUSPENSION SYSTEMS

(75) Inventor: Michael Neil Basnett, Crickhowell (GB)

(73) Assignee: MG Rover Group Limited, Longbridge (GB)

( * ) Notice: Subject to any disclaimer, the term of this patent is extended or adjusted under 35 U.S.C. 154(b) by 33 days.

(21) Appl. No.: 10/037,234

(22) Filed: Dec. 20, 2001

(65) Prior Publication Data

US 2002/0079666 A1 Jun. 27, 2002

(30) Foreign Application Priority Data

Dec. 27, 2000 (GB) .............................................. 0031642

(51) Int. Cl.$^7$ ................................................ B60G 3/12
(52) U.S. Cl. ......................... 280/124.128; 280/86.756; 280/124.13; 280/124.162; 280/124.163; 280/124.165; 280/124.166; 280/124.175; 280/124.176; 280/124.77; 280/124.132
(58) Field of Search ...................... 280/124.128, 124.13, 280/124.157, 124.162, 124.163, 124.165, 124.166, 124.175, 124.176, 124.177, 86.75, 86.756, FOR 112, FOR 115, FOR 120, FOR 122, FOR 172, 124.132

(56) References Cited

U.S. PATENT DOCUMENTS 4,834,416 A * 5/1989 Shimoe et al. ......... 280/124.13
6,022,034 A * 2/2000 Santo et al. .......... 280/124.128

FOREIGN PATENT DOCUMENTS

| DE | 2424649 | 12/1975 |
|---|---|---|
| EP | 0 048 956 A1 | 9/1981 |
| GB | 848416 | 9/1960 |
| GB | 1081963 | 9/1967 |
| GB | 1148336 | 4/1969 |
| GB | 2 351 050 A | 12/2000 |
| WO | 97/12733 | 4/1997 |

* cited by examiner

Primary Examiner—Eric Culbreth
(74) Attorney, Agent, or Firm—Davis & Bujold, PLLC

(57) ABSTRACT

A vehicle suspension system having first and second trailing arms (10), each trailing arm (10) being mounted to the vehicle adjacent its forward end (14) for pivotal movement about a transverse axis of the vehicle, one trailing arm (10) being located adjacent one side of the vehicle and adapted adjacent its trailing end (22) to support a first wheel of a vehicle and the other trailing arm (10) being located adjacent the other side of the vehicle and adapted adjacent its trailing end (22) to support a second wheel of the vehicle, the first and second wheels being located on a transverse axis of the vehicle, a torsion beam (24) being provided to control lateral separation of the trailing arms (10), and a pair of dynamic beams (30) being secured at their forward and rearward ends longitudinally of the vehicle, one dynamic beam (30) being located in juxtaposed relationship with each of the trailing arms (10), each trailing arm (10) being connected adjacent its trailing end (22) to the adjacent dynamic beam (10), at a point intermediate of the ends of the dynamic beam (30), the forward ends (14) of the trailing arms (10) being pivotally attached to the vehicle by means of bushes (16) with longitudinal compliance, minimum vertical compliance and controlled lateral compliance, the dynamic beams (30) being secured to the vehicle at their rearward end with longitudinal compliance but with zero or minimal lateral compliance and at their forward end with longitudinal compliance and with controlled lateral compliance.

16 Claims, 9 Drawing Sheets

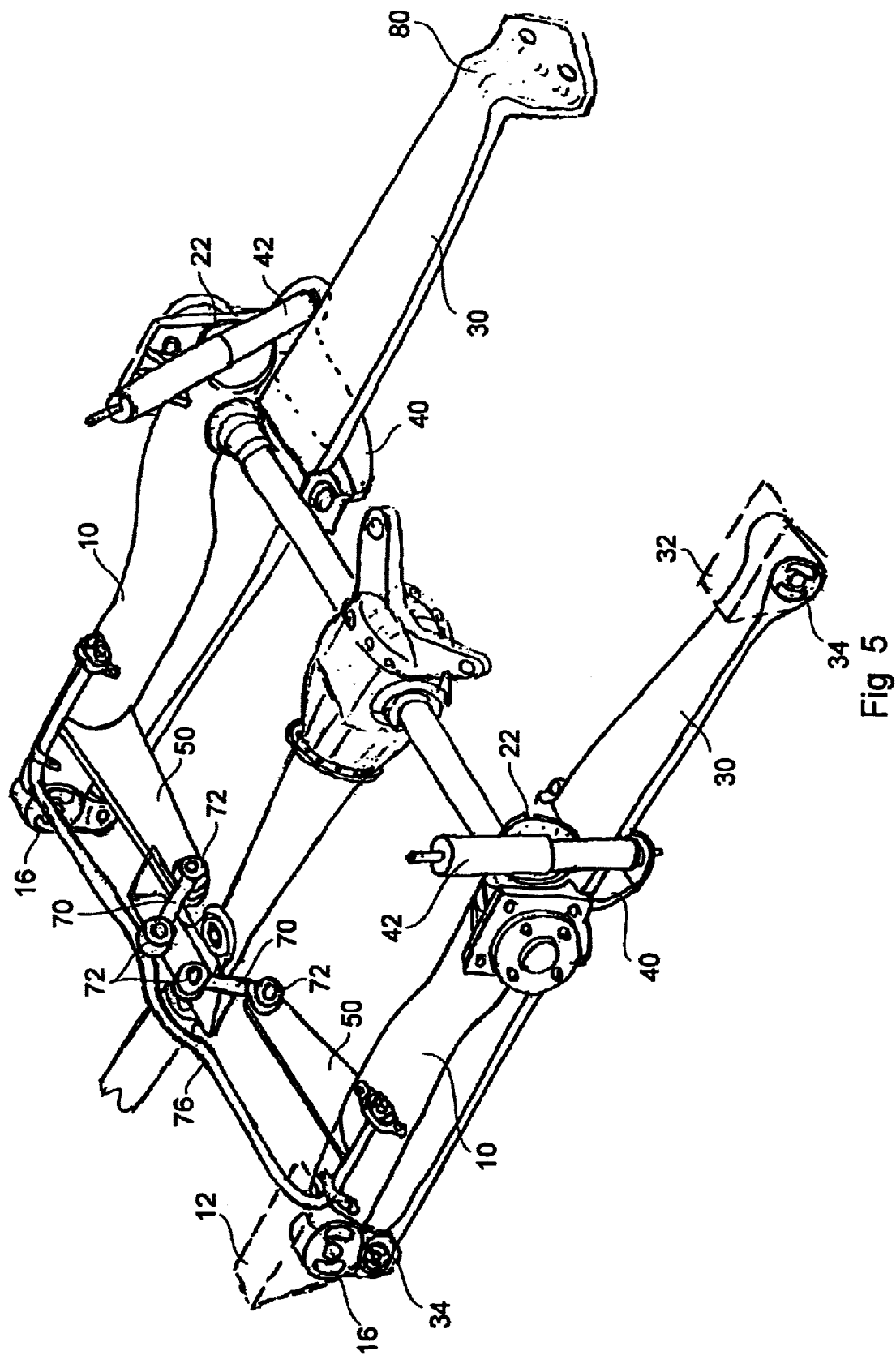

VEHICLE SUSPENSION SYSTEMS

The present invention relates to vehicle suspension systems and in particular to improvements in and relating to suspension systems for the rear wheels of a motor vehicle.

FIELD OF THE INVENTION

In 'H' frame or 'torsion beam' rear suspension systems a pair of trailing arms are pivotally connected at their forward ends to the vehicle and carry means for rotatably attaching the wheels of the vehicle at their rear end. The trailing arms are interconnected intermediate of their forward and trailing ends by a transverse torsion member. Helical compression springs act on the trailing arms adjacent their trailing ends.

The torsion member of such suspension systems allows the trailing arms to move generally laterally together while permitting a degree of independent vertical movement of the wheels. However, due to lateral flexibility of the 'H' frame, the lateral deformation induces undesirable dynamic steering effects. In order to overcome such effects, it has been proposed, for example in WO97/127373 and DE2424649, to pivot the trailing arms about bushes which are not parallel but are oppositely inclined to a transverse axis of the vehicle. In this manner, lateral forces acting on the bushes compensate for lateral distortion of the 'H' frame.

BACKGROUND OF THE INVENTION

The present invention relates to modifications to 'H' frame suspension systems which negates the problem of lateral deformation of the 'H' frame and permits adaption of the system to promote geometrically controlled passive steering effects as well as improved camber control.

According to one aspect of the present invention, a vehicle suspension system comprises first and second trailing arms, each trailing arm being mounted to the vehicle adjacent its forward end for pivotal movement about a transverse axis of the vehicle, a first trailing arm being located adjacent one side of the vehicle and adapted adjacent its trailing end to support a first wheel of the vehicle, a second trailing arm located adjacent the other side of the vehicle and adapted adjacent its trailing end to support a second wheel of the vehicle, the first and second wheels being located on a transverse axis of the vehicle, means being provided to control lateral separation of the trailing arms, and a pair of dynamic beams being secured at their forward and rearward ends longitudinally of the vehicle, one dynamic beam being located in juxtaposed relationship with each of the trailing arms, each trailing arm being connected adjacent its trailing end to the adjacent dynamic beams, at a point intermediate of the ends of the dynamic beam; wherein the forward ends of the trailing arms are pivotally attached to the vehicle by means of bushes with longitudinal compliance, minimal vertical compliance and controlled lateral compliance, while the dynamic beams are secured to the vehicle at their rearward ends with longitudinal compliance but with zero or minimal lateral compliance and at their forward ends with longitudinal compliance and with controlled lateral compliance.

In accordance with the present invention, the dynamic beams will permit resilient vertical movement of the trailing arms, while inhibiting lateral deformation and the adversely dynamic steering effects associated therewith. The dynamic beams will also strengthen the 'H' frame of the suspension system giving improved fatigue life. When a lateral load is applied to the suspension system, for example when the vehicle is cornering, the forward end of the trailing arm/dynamic beam assembly will move laterally in controlled manner, while the rearward ends of the dynamic beams will remain fixed laterally, so that passive steering of the suspension will be controlled geometrically. In accordance with the preferred embodiment of the invention, the forward ends of the dynamic beams may be secured to the vehicle via the bushes which secure the forward ends of the trailing arms.

Lateral separation of the trailing arms may be controlled by means of a torsion member which extends laterally between the trailing arms, intermediate of the forward and trailing ends of the arms, in the manner of a conventional 'H' frame suspension. However, according to a further preferred embodiment of the invention, laterally extending camber control arms are secured to the trailing arms intermediate of their forward and trailing ends, the camber control arms extending towards one another, the inner ends of the camber control arms being pivotally attached to the vehicle. In this manner, as the trailing arms move upward and downward, the camber control arms will cause the trailing arms to twist thereby altering the camber angle of the wheel supported thereby. The variation in camber angle achieved in this manner may be controlled by suitable positioning of the effective pivoting point of the camber control arms longitudinally relative to the trailing arms and the length of the camber control arms.

Moreover, camber control corresponding to the passive steering may be achieved by arranging for the pivot axis of the camber control arms to move laterally of the vehicle along a path inclined to a transverse axis of the vehicle. This may be achieved by the use of inclined links to pivotally connect the inner ends of the camber control arms to the vehicle body or by locating the camber control arm pivots in transversely inclined slots or grooves or inclined compliant bushes.

A toe control bar may furthermore be provided to interconnect the trailing arms laterally adjacent their forward ends, to control lateral separation of the arms. Alternatively, or in addition, a torsion bar may be used for this purpose and to control roll of the vehicle.

Any suitable design of bush which will provide the required compliance in respect of movement in the longitudinal, vertical and transverse directions, may be used in the present invention. However, void bushes which will provide compliance longitudinally with minimal vertical compliance and which are designed to provide controlled lateral compliance, when required, are particularly suitable.

The invention is now described, by way of example only, with reference to the accompanying drawings, in which:

DETAILED DESCRIPTION OF INVENTION

Figure 1:
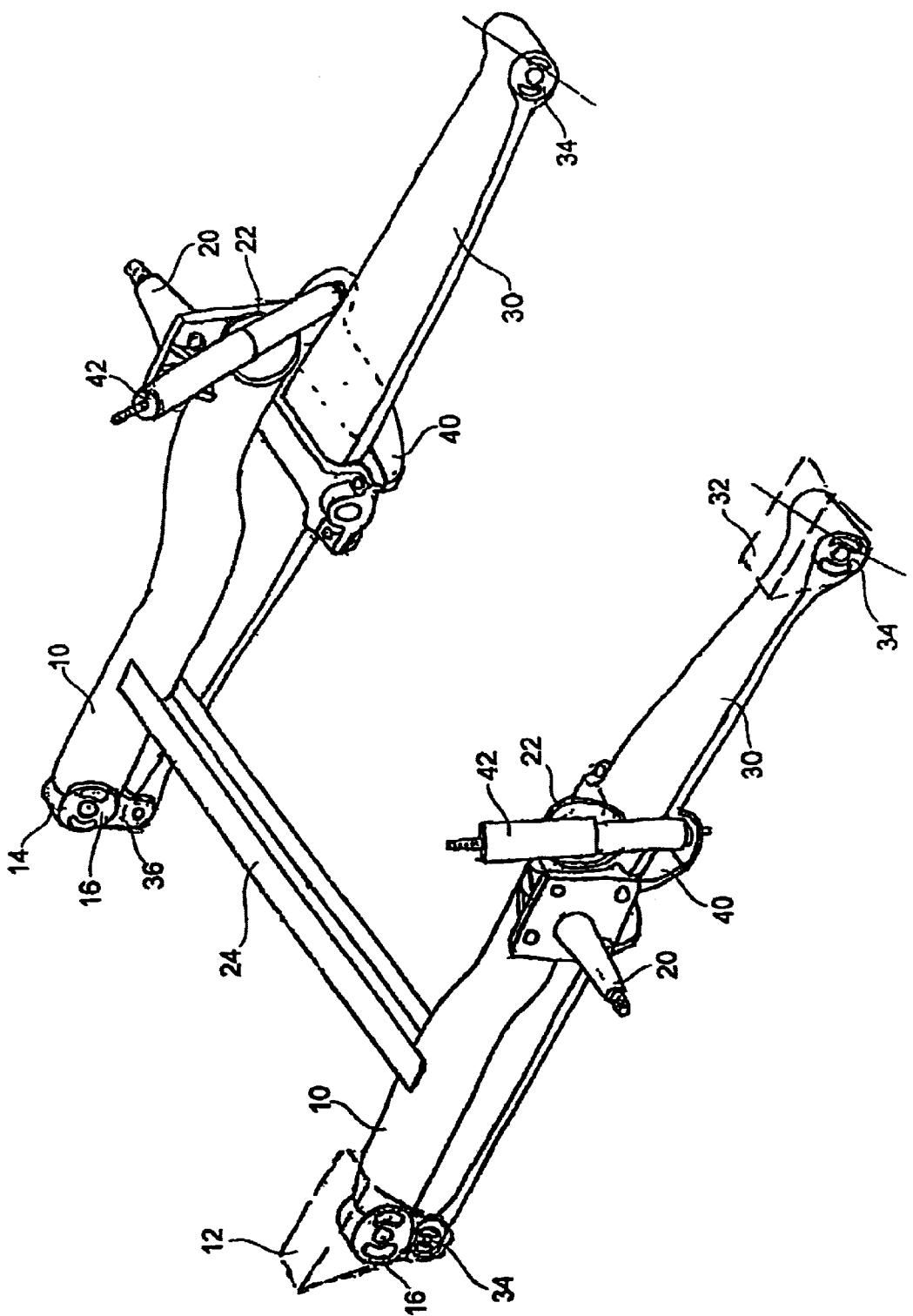
FIG. 1 illustrates diagrammatically a suspension system in accordance with the present invention.

As illustrated in FIG. 1, a rear suspension for a front wheel drive motor vehicle comprises a pair of trailing arms 10, each trailing arm being pivotally mounted longitudinally of the vehicle by means of brackets 12 (only one shown), one trailing arm adjacent each side of the vehicle. The trailing arms 10 are pivotally mounted to brackets 12, adjacent their forward ends 14, by means of bushes 16 which are compliant longitudinally of the vehicle, have minimal vertical compliance and have controlled lateral compliance.

Stub axles 20 are secured adjacent the trailing ends 22 of the trailing arms 10, the stub axles 20 extending away from one another on a common transverse axis of the vehicle, to support the rear road wheels 23 of the vehicle.

A torsion beam 24 extends transversely between the trailing arms 10 and is secured to the trailing arms 10 at points intermediate of the forward and trailing ends 14,22 thereof. The torsion beam 24 ties the trailing arms 10 together laterally, so that lateral forces will cause the wheels to move together. However, the torsion beam 24 will twist about its axis to permit a degree of independent vertical movement of the trailing arms 10.

A pair of dynamic beams or leaf springs 30 are mounted longitudinally of the vehicle, one dynamic beam 30 extending below each of the trailing arms 10. The dynamic beams 30 may be made of steel, composite material or other suitable material and may comprise a single leaf or multiple leaves.

Figure 5A:
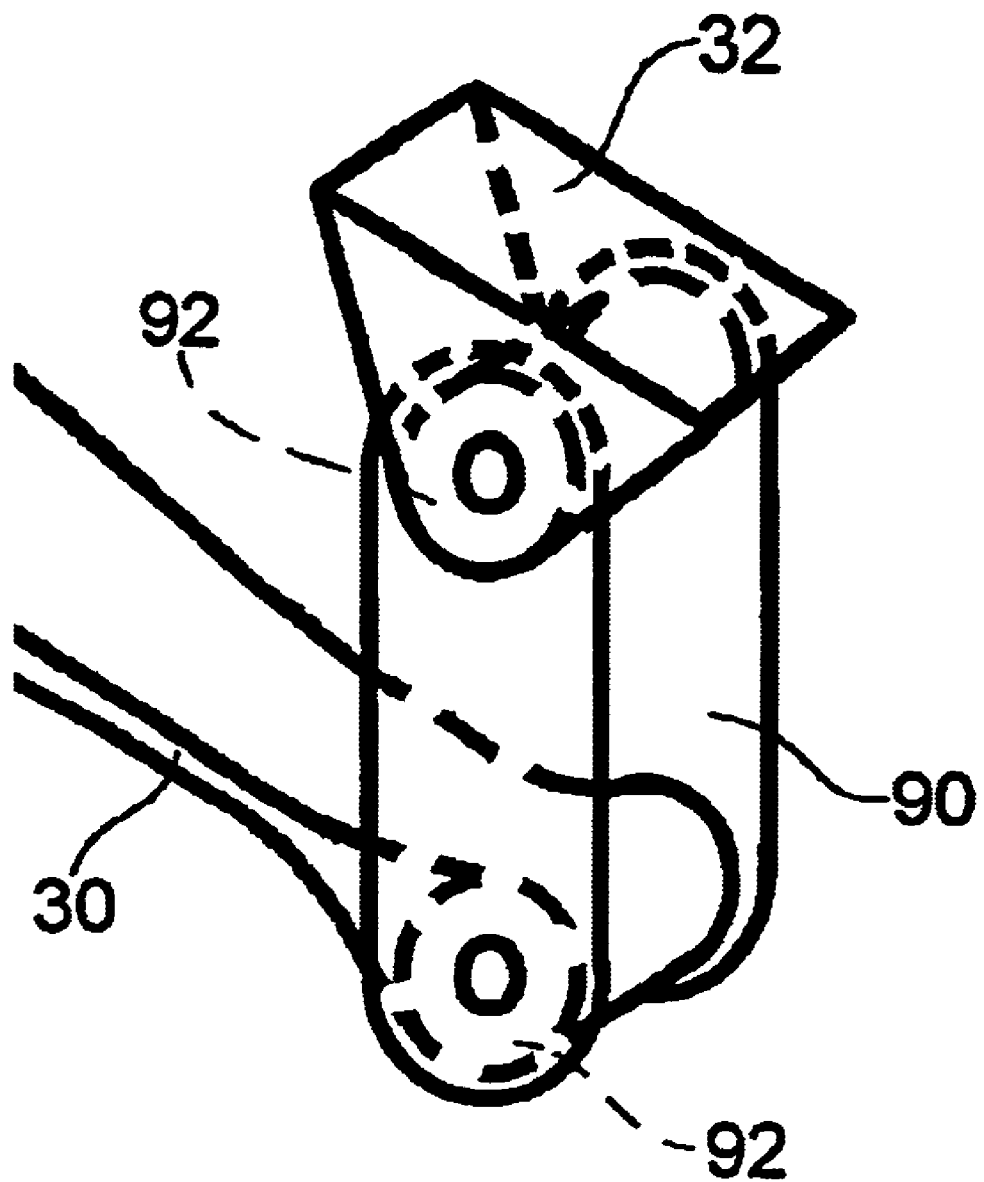
FIG. 5 illustrates further modifications to the suspension system illustrated in FIG. 3 while FIG. 5A schematically illustrates an alternative means of securing the trailing ends of the dynamic beams of the embodiment, illustrated in FIG. 5, to the vehicle.

The dynamic beams 30 are mounted to the vehicle rearwardly of the trailing end 22 of the trailing arms 10, by means of brackets 32 (only one shown), in a manner which will provide longitudinal compliance but zero or minimal lateral or torsional compliance. Void bushes 34 may be suitable for this purpose, although in order to provide the required degree of longitudinal compliance, shackles 90 mounted in solid rubber bushes 92, as illustrated in FIG. 5A, may be preferable. Alternatively, if the dynamic beams 30 are formed from composite materials, they may be provided with live hinge formations 80, as illustrated in FIG. 5, to provide for longitudinal compliance.

The dynamic beams 30 are connected at their forward ends to the forward ends of the trailing arms 10, beneath the bushes 16, by means of bushes 34 which engage between lugs 36 extending downwardly from the trailing arms 10. The forward ends of the dynamic beams 30 are thereby connected to the vehicle body via the trailing arms 10 at brackets 12. Bushes 34 between the dynamic beams 30 and trailing arms 10 are longitudinally compliant but have zero or minimal lateral compliance.

The trailing arms 10 are connected adjacent their trailing ends 22, to the underlying dynamic beams 30, intermediate of the ends of the dynamic beams 30, by brackets 40, so that vertical movement of the trailing arms 10 will be resiliently controlled by the dynamic beams 30. Telescopic damper units 42 extend from brackets 40 to the vehicle body, low down in the wheel cavity thereof.

The above described suspension will act in the manner of a conventional 'H' frame or torsion beam rear suspension, the torsion beam 24 restraining the trailing arms 10 to move laterally together, while twisting of the torsion beam 24 permits a degree of independent vertical movement of the wheels. The use of dynamic beams 30 in place of helical compression springs however significantly improves the transverse rigidity of the 'H' frame, thus reducing distortion thereof and undesirable dynamic steering effects.

Figure 2:
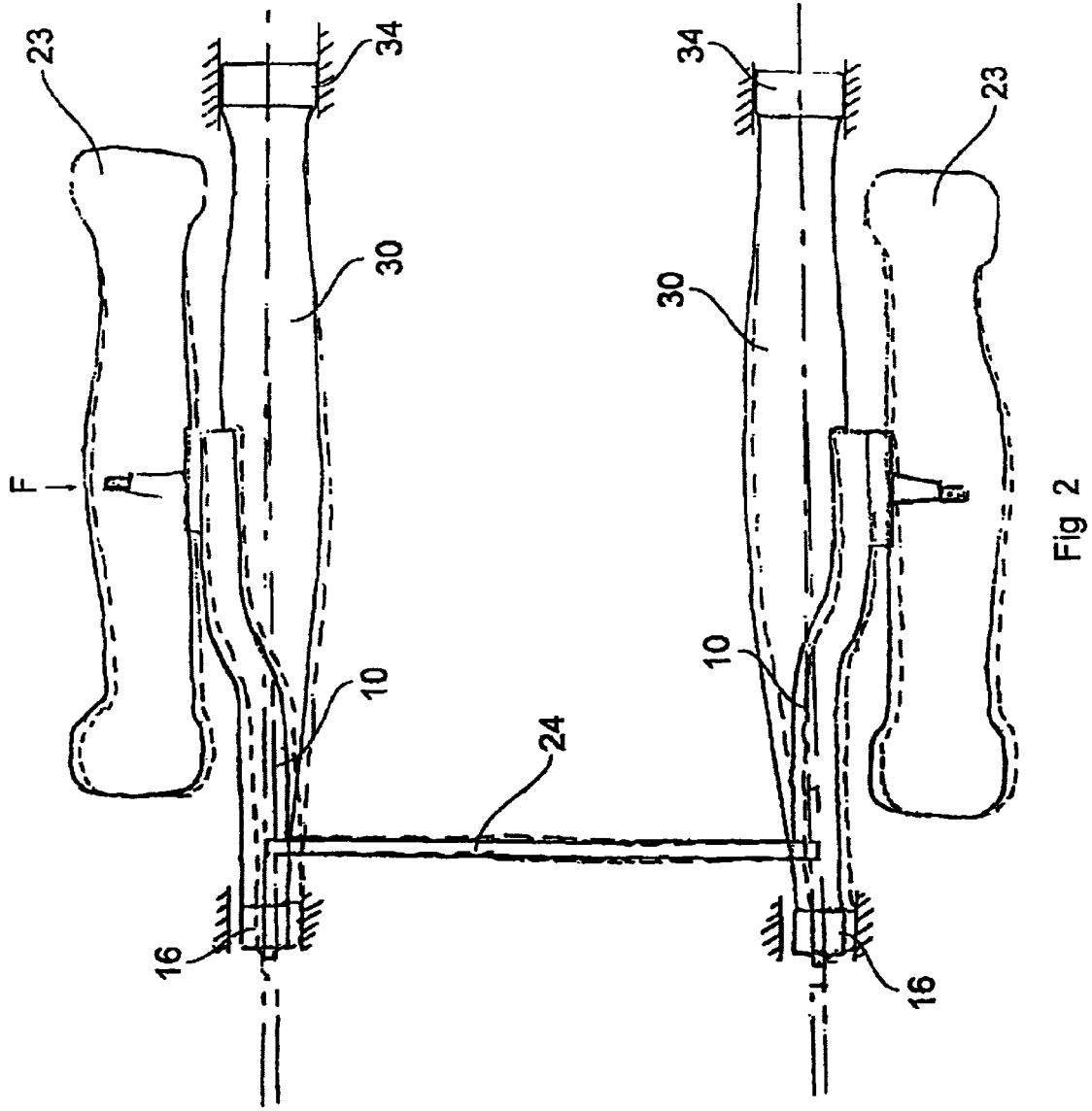
FIG. 2 is a plan view of the suspension system illustrated in FIG. 1, illustrating the passive steering effect induced when a lateral load is applied to the suspension.

Furthermore, the use of bushes 16 which have controlled lateral compliance at the forward end of the trailing arms 10 will permit the suspension to be deflected at the forward end by lateral cornering forces F, while being anchored laterally at the trailing end of the dynamic beams 30, as illustrated in FIG. 2. This, together with the improved lateral stiffness of the suspension will permit passive steering which may be controlled geometrically.

Figure 3:
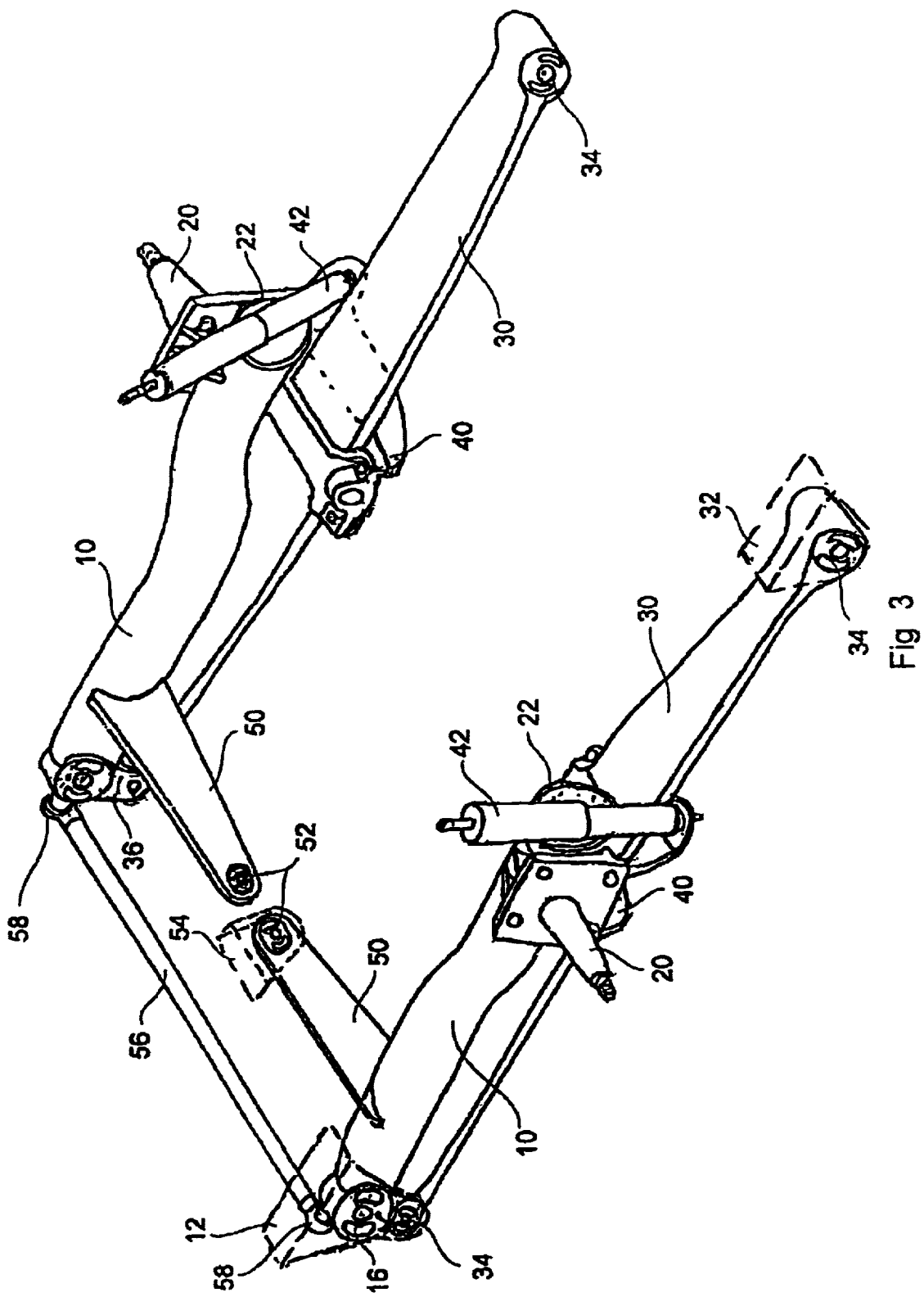
FIG. 3 illustrates modifications to the suspension system illustrated in FIG. 1.

In the modification illustrated in FIG. 3, the torsion beam 24 is replaced by a pair of camber control arms 50. The camber control arms 50 are secured, one on each of the trailing arms 10, intermediate of the forward and trailing ends 14,22 of the trailing arms 10. The camber control arms 50 extend towards one another along a common transverse axis of the vehicle. The inner ends of the camber control arms 50 are pivotally attached to the vehicle body by means of bushes 52 and brackets 54 (only one shown). The bushes 52 are laterally and longitudinally compliant but have minimal vertical compliance.

A toe control bar 56 is connected across the forward ends of the trailing arms 10 by ball joint links 58. The toe control bar 56 may include adjustment means, for example a screw adjuster, by which its length may be adjusted to control the toe angle of the suspension.

With this modified suspension., as the trailing arms 10 move upwardly and downwardly, the camber control arms 50 will pivot about their inner ends, causing the trailing arms 10 to twist, thereby adjusting the camber angle, that is the angle of the wheel in a transverse vertical plane. For example, when the vehicle is cornering, the transfer of weight of the vehicle will cause the inside wheels to be lifted while the outside wheels are depressed. As a consequence, the trailing arm 10 on the inside of the bend will move downwardly relative to the vehicle. This downward movement will cause the camber control arm 50 to twist the trailing arm 10, so that the stub axle 20 on that side is twisted downwardly, thereby causing the wheel attached thereto to lean into the bend and improving the road holding of the wheel. Similarly, the trailing arm of the suspension, on the outside of the bend, will move downwardly relative to the vehicle causing the trailing arm 10 to be twisted so that the stub axle 20 on that side is twisted upwardly, again causing the wheel attached thereto to lean into the bend. The amount of camber angle control achieved in this manner depends upon the longitudinal positioning of the effective pivoting points of the camber control arms 50 longitudinally relative to the trailing arms 10 and the length of the camber control arms 50, which may be adjusted as required, when designing the suspension system.

Figure 4:
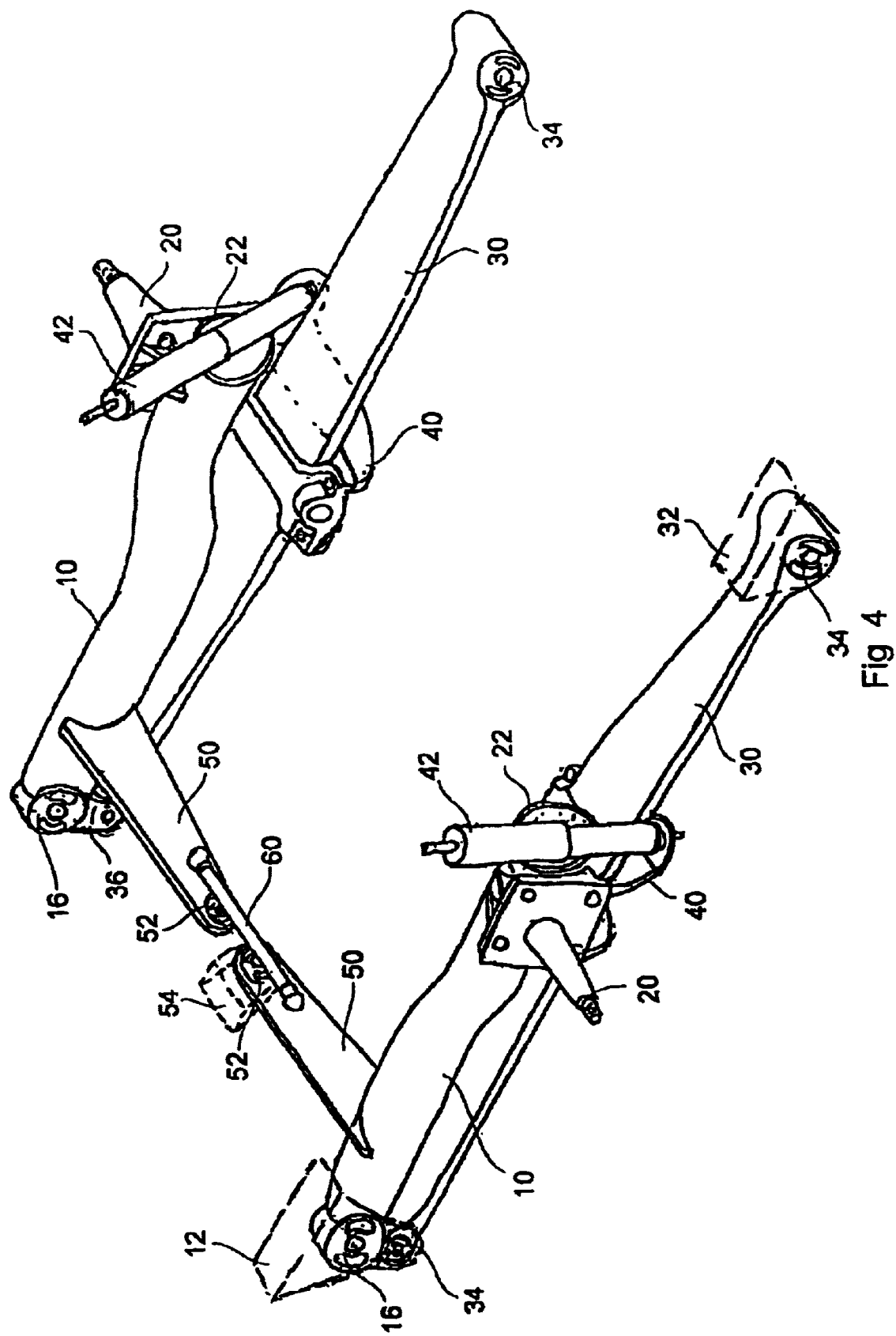
FIG. 4 illustrates an alternative modification to the suspension system illustrated in FIG. 3.

In the embodiment illustrated in FIG. 4, the toe control link 60 is connected between the camber control arms 50.

FIG. 5 shows the suspension system of the present invention, in a rear wheel drive configuration. This figure shows a further modification to the suspension system, in which the inner ends of the camber control arms 50 are secured to the vehicle body by means of links 70. The links 70 are inclined downwardly and outwardly from the vehicle body. With this arrangement when a lateral force is applied to the suspension during cornering, the lateral shift of the front end of the suspension will cause link 70 on the inside of the bend to pivot downwardly so that the pivot at the inner end of the inner control arm 50 will move downwardly twisting the inner trailing arm 10. The camber angle of the wheel on the inside of the corner will be adjusted so that the tire leans into the bend. At the same time, the link 70 on the outside of the corner pivots upwardly, lifting the pivot point of the camber control arm 50 on that side of the vehicle, thereby twisting the trailing arm 10 so that the camber angle of the outer wheel is adjusted and the wheel again leans into the corner. The camber angle will consequently adjust not only with vertical movement of the suspension, but also with passive steering of the rear wheels of the vehicle.

The pivots between the inner ends of camber control arms 50 and the link 70 and between the link 70 and the vehicle body, may be provided by ball joints 72.

Furthermore, in the embodiment of the invention illustrated in FIG. 5, the toe control bar is replaced by an anti-roll bar 76, which in addition to controlling the toe of the rear wheels will also torsionally interconnect the trailing arms 10, thereby providing anti-roll control.

According to a preferred embodiment of the present invention, the bushes 16 used at the pivot connection between the front ends of the trailing arms 10 and the vehicle body, to provide longitudinal compliance, with minimum vertical compliance and controlled lateral compliance, are preferably void bushes.

Figure 7:
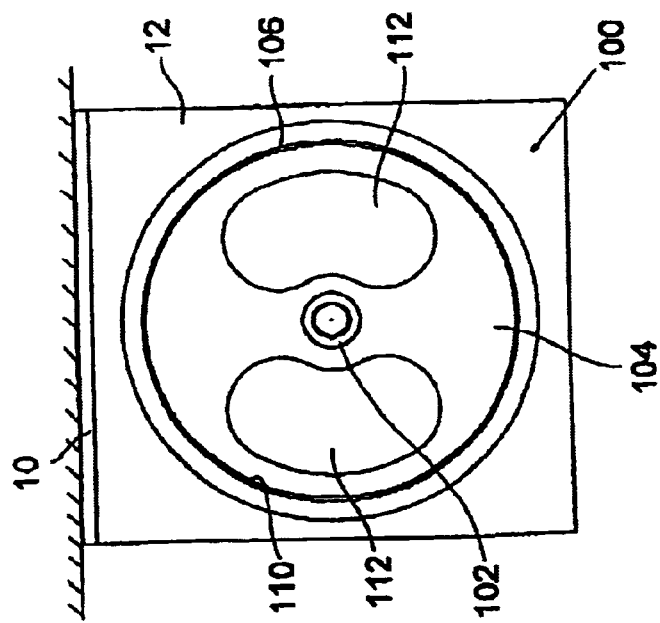
FIG. 7 is a cross-section of the bush illustrated in FIG. 6.
Figure 6:
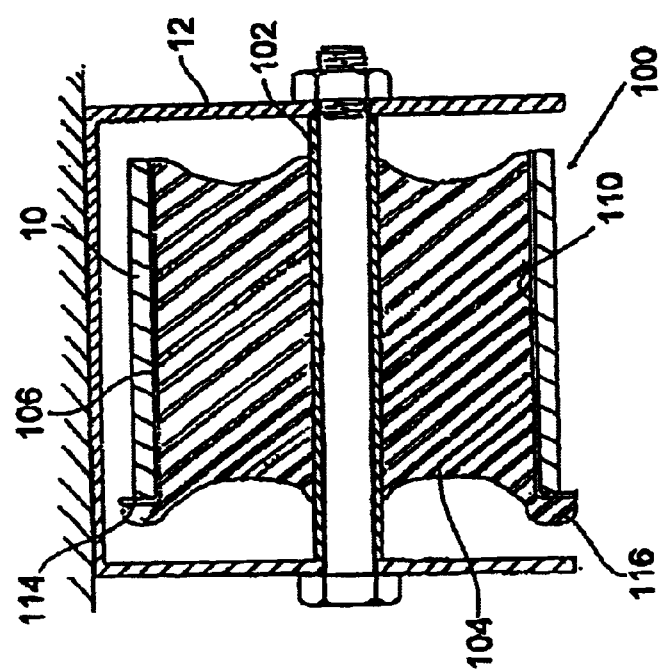
FIG. 6 illustrates a bush as used in the suspension system illustrated in any one of FIGS. 1 to 5, to provide controlled lateral compliance.

As illustrated in FIGS. 6 and 7, such void bushes 100 have an inner tubular metal or rigid plastics member 102 by which the bush 100 may be bolted to the bracket 12. The inner member 102 is surrounded by a cylindrical elastomeric member 104 which in turn is surrounded by a metal or rigid plastics outer member 106. The elastomeric member 104 is bonded at its internal diameter to the inner member 102 and at its external diameter to the outer member 106. This may be achieved by moulding the elastomeric member 104 in situ, between the inner and outer members 102 and 106. The outer member 106 is a press fit within a cylindrical aperture 110, at the forward end of the trailing arm 10.

Axially extending apertures 112 are provided at diametrically opposed locations through the elastomeric member 104, the axis of the apertures 112 being disposed in a horizontal plane, in order to provide longitudinal compliance, while the solid elastomeric material between the apertures 112, will provide minimal compliance in the vertical direction. At the outboard ends of each of the bushes 100 supporting each of the trailing arms 10, the outer member 106 has an outwardly directed flange formation 114. The elastomeric member 104 is moulded to form an annular snubber formation 116, which will limit axial movement of the bush 100, by abutment with the adjacent side of bracket 12. Lateral movement will consequently be controlled by the stiffness of the elastomeric member 104, the snubber formation 116 of the bush on one side of the vehicle limiting lateral movement of the suspension to that side and the snubber formation 116 of the bush on the other side of the vehicle limiting lateral movement of the suspension to said other side. The bushes 100 will typically permit 10 mm of lateral movement to each side, giving a passive steering angle of up to 0.5°.

Figure 8:
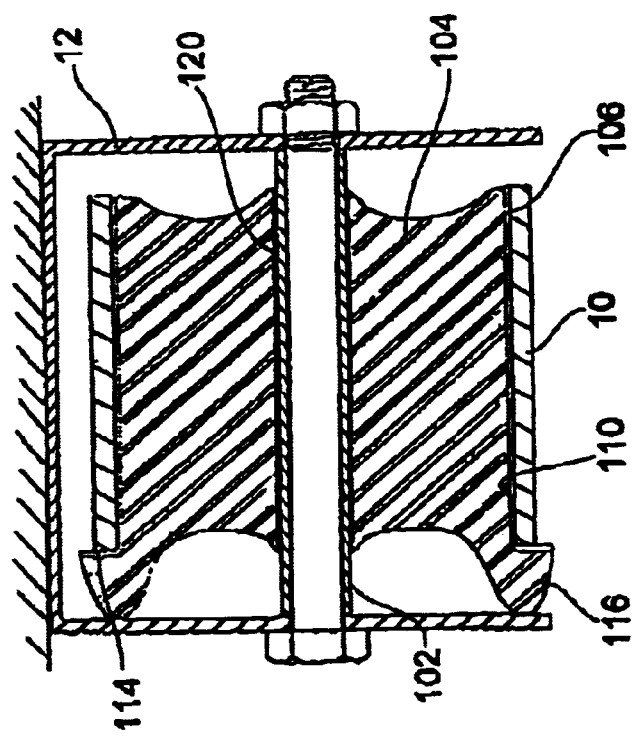
FIG. 8 illustrates an alternative form of bush which may be used to provide controlled lateral compliance.

In the modified bush illustrated in FIG. 8, a low friction sleeve 120 which may be made of low friction fabric, is interposed between the inner member 102 and the elastomeric member 104. The elastomeric member 104 is thereby freely slidable on the inner member 102. The snubber formations 116 are enlarged so that they abut the bracket 12. Lateral movement of the bush 100, is thereby controlled by compression of the snubber formation 116, as well as the maximum displacement thereof.

Figure 9:
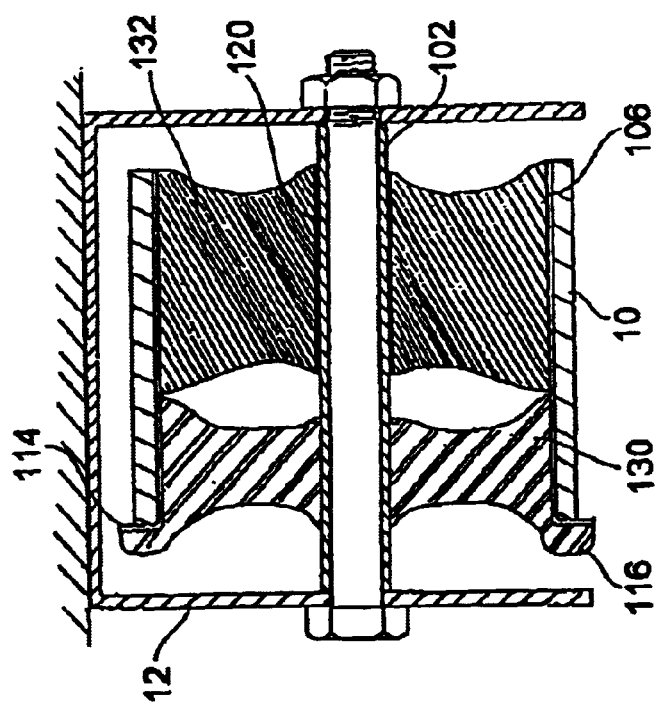
FIG. 9 is a modification to the bush illustrated in FIG. 8.

In the modified bush construction illustrated in FIG. 9, a combination of elastomeric members 130 and 132, one member 130 being bonded to the inner member 102 and the other member 132 being slidably mounted in the inner member 102, provide the required lateral compliance. Alternatively, a single elastomeric member 104 may be partially bonded and partially slidable on the inner member 102.

Figure 10:
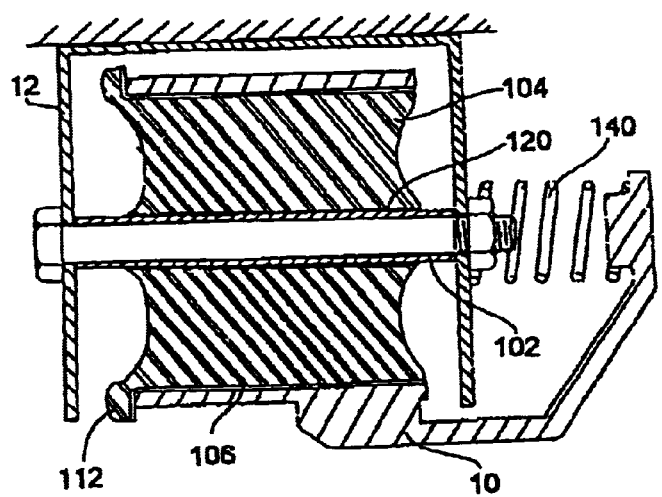
FIG. 10 is a further modification to the bush illustrated in FIG. 8.
Figure 11:
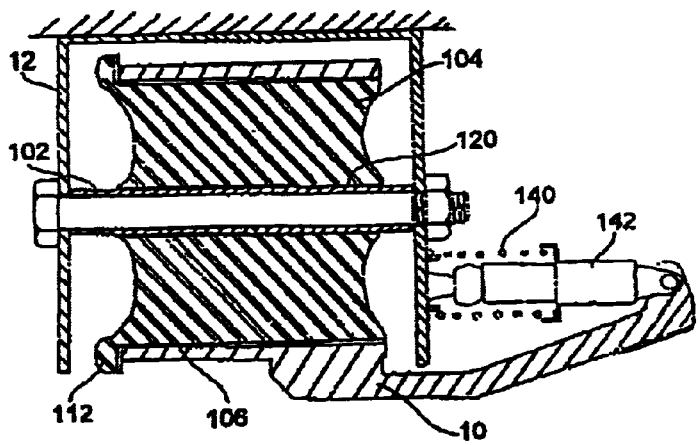
FIG. 11 shows further modifications to the bush illustrated in FIG. 8.

In the modified bush illustrated in FIG. 10, separate spring means 140 acts between the trailing arm 10 and the bracket 12 to control lateral movement of the arm 10. In addition, a damper unit 142 may also be included, as illustrated in FIG. 11.

Figure 12:
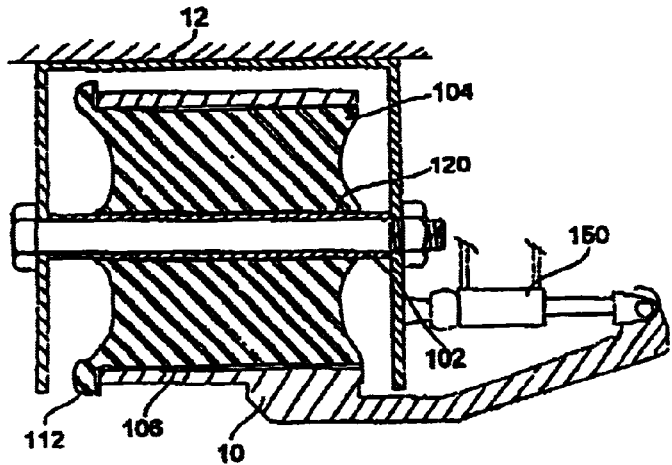
FIG. 12 shows still further modifications to the bush illustrated in FIG. 8.

In a further embodiment, a linear actuator, for example a hydraulic cylinder or stepper motor may act on the trailing arm 10, to provide active steering of the rear suspension, for example as illustrated in FIG. 12.

What is claimed is:

1. A vehicle suspension system comprising first and second trailing arms (10), each trailing arm (10) being mounted to the vehicle adjacent its forward end (14) for pivotal movement about a transverse axis of the vehicle, a first trailing arm (10) being located adjacent one side of the vehicle and adapted adjacent its trailing end (22) to support a first wheel of a vehicle, a second trailing arm (10) being located adjacent the other side of the vehicle and adapted adjacent its trailing end to support a second wheel of the vehicle, the first and second wheels being located on a transverse axis of the vehicle, means being provided to control lateral separation of the trailing arms, and a pair of dynamic beams being secured at their forward and rearward ends longitudinally of the vehicle, one dynamic beam being located in juxtaposed relationship with each of the trailing arms, each trailing arm being connected adjacent its trailing end to the adjacent dynamic beam, at a point intermediate of the ends of the dynamic beam; wherein the forward ends of the trailing arms are pivotally attached to the vehicle by means of bushes with longitudinal compliance, minimum vertical compliance and controlled lateral compliance, the dynamic beams being secured to the vehicle at their rearward ends with longitudinal compliance but with zero or minimal lateral compliance and at their forward end with longitudinal compliance and with controlled lateral compliance.

2. The suspension system according to claim 1 in which the forward ends of the dynamic beams are secured to the vehicle via the forward ends of the trailing arms.

3. The vehicle suspension system according to claim 1 in which a torsion beam extends laterally between the trailing arms, the torsion beam being connected to the trailing arms intermediate of the forward and trailing ends of the trailing arms.

4. The suspension system according to claim 1 in which camber control arms are secured to the trailing arms intermediate of the forward and trailing ends of the arms, the camber control arms extending towards one another on a transverse axis of the vehicle, the inner ends of the camber control arms being pivotally attached to the vehicle.

5. The suspension system according to claim 4 in which a pivot axis of the camber control arms are arranged to move laterally of the vehicle along a path inclined to the transverse axis of the vehicle, upon lateral displacement of the suspension system.

6. The suspension system according to claim 5 in which the camber control arms are pivotally attached to the vehicle body by means of links, said links extending downwardly and outwardly from the vehicle body.

7. The suspension system according to claim 1 in which a toe control bar is mounted between the trailing arms to control the toe angle of the suspension.

8. The suspension system according to claim 7 in which the toe control bar extends between the forward ends of the trailing arms.

9. The suspension system according to claim 7 in which the toe control bar extends between a pair of camber control arms, the camber control arms each being secured to a different one of the trailing arms, intermediate of the forward and trailing ends of the arms.

10. The suspension system according to claim 1 in which an anti-roll bar is mounted between the trailing arms to control the toe angle of the suspension and to moderate roll of the vehicle.

11. The suspension system according to claim 1 in which the trailing arms are pivotally attached to the vehicle by means of void bushes, means being provided on the void bushes to control lateral movement of the trailing arms.

12. The suspension system according to claim 11 in which the bush on one side of the vehicle controls lateral movement of the suspension to that side of the vehicle and the bush on the other side of the vehicle controls lateral movement of the suspension to said other side of the vehicle.

13. The suspension system according to claim 11 in which a snubber formation is provided on said void bushes to control at least one of lateral movement an displacement of the suspension.

14. A The suspension system according to claim 11 in which a separate spring or springs and damper means are provided to control lateral movement of the trailing arms.

15. The suspension system according to claim 11 in which linear actuation means are provided to control lateral movement of the trailing arms.

16. The suspension system according to claim 1 in which the rear ends of the dynamic beams are secured to the vehicle by means of void bushes, shackles or live hinge formations.

* * * * *